United States Patent
Xia et al.

(10) Patent No.: US 11,494,618 B2
(45) Date of Patent: Nov. 8, 2022

(54) ANOMALY DETECTION USING DEEP LEARNING ON TIME SERIES DATA

(71) Applicant: NEC Laboratories America, Inc., Princeton, NJ (US)

(72) Inventors: Ning Xia, Plainsboro, NJ (US); Dongjin Song, Princeton, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 577 days.

(21) Appl. No.: 16/558,639

(22) Filed: Sep. 3, 2019

(65) Prior Publication Data

US 2020/0074275 A1 Mar. 5, 2020

Related U.S. Application Data

(60) Provisional application No. 62/726,501, filed on Sep. 4, 2018.

(51) Int. Cl.
*G06N 3/04* (2006.01)
*G06F 16/23* (2019.01)

(52) U.S. Cl.
CPC ......... *G06N 3/049* (2013.01); *G06F 16/2365* (2019.01); *G06N 3/0445* (2013.01)

(58) Field of Classification Search
CPC .......... G06F 16/2365; G06N 3/0427; G06N 3/0445; G06N 3/0454; G06N 3/049; G06N 3/084
See application file for complete search history.

(56) References Cited

U.S. PATENT DOCUMENTS

| | | | |
|---|---|---|---|
| 2012/0041575 A1* | 2/2012 | Maeda | G05B 23/024 700/79 |
| 2014/0201126 A1* | 7/2014 | Zadeh | A61B 5/165 706/52 |
| 2016/0210556 A1* | 7/2016 | Ben Simhon | G06N 20/00 |
| 2019/0206520 A1* | 7/2019 | Eteminan | G16H 10/20 |

OTHER PUBLICATIONS

Xu et al., "A Hierarchical Framework Using Approximated Local Outlier Factor for Efficient Anomaly Detection", 2013, Procedia Computer Science 19 (2013), pp. 1174-1181. (Year: 2013).*

Yao Qin et al., "A Dual-Stage Attention-Based Recurrent Neural Network for Time Series Prediction", Proceedings of the Twenty-Sixth International Join Conference on Artificial Intelligence, Apr. 2017.

Varun Chandola et al., "Anomaly Detection: A Survey", Technical Report, Department of Computer Science and Engineering, University of Minnesota, Aug. 15, 2007.

Animesh Patcha et al., "An overview of anomaly detection techniques: Existing solutions and latest technological trends", Bradley Department of Electrical and Computer Engineering, Virginia Polytechnic Institute and State University, Feb. 2007.

\* cited by examiner

*Primary Examiner* — Brent Johnston Hoover
(74) *Attorney, Agent, or Firm* — Joseph Kolodka (57) ABSTRACT

Methods and systems for detecting and correcting anomalies include comparing a new time series segment, generated by a sensor in a cyber-physical system, to previous time series segments of the sensor to generate a similarity measure for each previous time series segment. It is determined that the new time series represents anomalous behavior based on the similarity measures. A corrective action is performed on the cyber-physical system to correct the anomalous behavior.

14 Claims, 8 Drawing Sheets

ANOMALY DETECTION USING DEEP LEARNING ON TIME SERIES DATA

RELATED APPLICATION INFORMATION

This application claims priority to U.S. Provisional Patent Application No. 62/726,501, filed on Sep. 4, 2018, incorporated herein by reference herein its entirety.

This application is related to U.S. patent application Ser. No. 16/245,740, filed on Jan. 11, 2019, incorporated by reference herein in its entirety.

BACKGROUND

Technical Field

The present invention relates to multivariate time series retrieval in complex systems and, more particularly, anomaly detection using multivariate time series.

Description of the Related Art

Multivariate time series data is common across many practical applications, including for example power plant monitoring, health care, wearable devices, automobile monitoring, internet of things applications, etc. The retrieval of multivariate time series characterizes how one obtains relevant time series segments from historical data when given a current multivariate time series segment. In other words, finding a matching time series in the historical data, using a particular known time series, can be particularly challenging.

SUMMARY

A method for detecting and correcting anomalies includes comparing a new time series segment, generated by a sensor in a cyber-physical system, to previous time series segments of the sensor to generate a similarity measure for each previous time series segment. It is determined that the new time series represents anomalous behavior based on the similarity measures. A corrective action is performed on the cyber-physical system to correct the anomalous behavior.

A system for detecting and correcting anomalies includes an anomaly detector configured to compare a new time series segment, generated by a sensor in a cyber-physical system, to previous time series segments of the sensor to generate a similarity measure for each previous time series segment and to determine that the new time series represents anomalous behavior based on the similarity measures. A controller is configured to perform a corrective action on the cyber-physical system to correct the anomalous behavior.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide anomaly detection in cyber-physical systems that include potentially large numbers of sensors. In particular, the present embodiments accept the output of sensors and split them into time segments. A set of historical time segments for each sensor is stored in a database and newly recorded time segments are compared against the stored time segments. When the new time segments deviate substantially from the previously recorded time segments, an anomaly is detected and a corrective action is performed.

Thus, rather than building a machine learning model, the present embodiments simply use a set of known-normal measurements and use similarity to identify new and anomalous circumstances. The present embodiments can thus identify new types of anomaly without needing accurate labels for such anomalies to be generated in advance.

Figure 1:
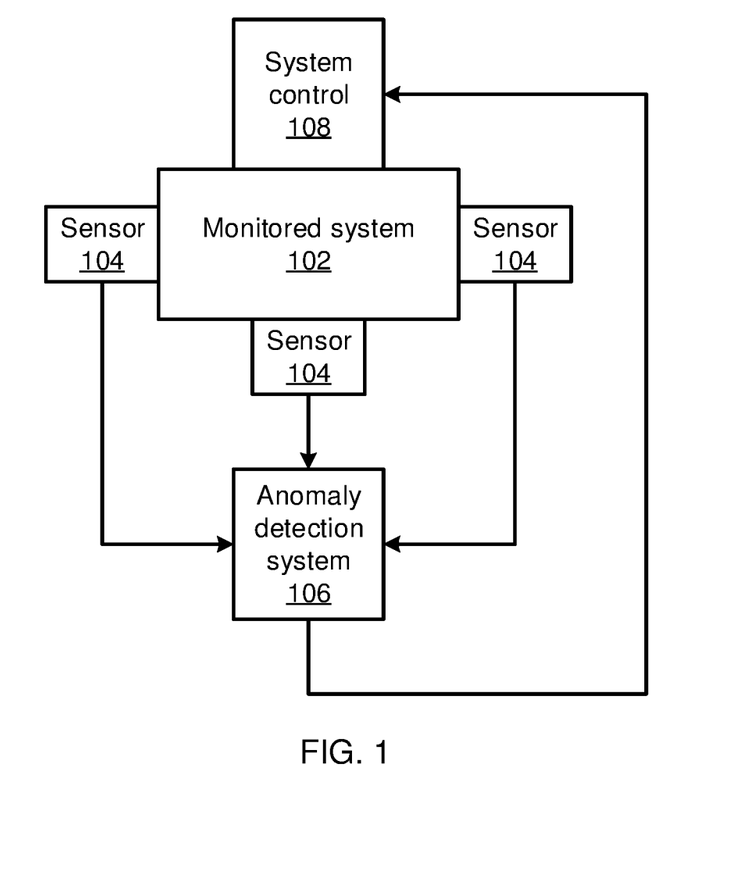
FIG. 1 is a block diagram of a monitored system with anomaly detection and correction in accordance with an embodiment of the present invention.

Referring now to FIG. 1, an anomaly detection system 106 is shown in the context of a monitored system 102. The monitored system 102 can be any appropriate system, including physical systems such as manufacturing lines and physical plant operations, electronic systems such as computers or other computerized devices, wearable devices, vehicles, Internet of Things devices, and software systems such as operating systems and applications. Cyber-physical systems can include multiple types of such systems.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats. It is specifically contemplated that the sensors 104 may generate time series data, represented as an ordered list of records that may or may not have associated timestamps indicating a time at which each respective record was generated.

The sensors 104 may transmit the logged sensor information to an anomaly detection system 106 by any appropriate communications medium and protocol, including wireless and wired communications. The anomaly detection system 106 compares a sequence of recently measured time series data to a body of previously recorded sets of data and retrieves one or more matching historical instances. These retrieved instances may have associated labels that describe conditions or activities of the monitored system 102 during time periods associated with the retrieved instances. In some cases, the label of a retrieved instance can indicate that the monitored system 102 is behaving in an anomalous or otherwise disadvantageous way. In other instances, where no match is found, an anomaly can be indicated from the fact that the present behavior does not reflect known-normal behavior.

Once anomalous behavior has been detected, the anomaly detection system 106 communicates with a system control unit 108 to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The anomaly detection system 106 thereby automatically corrects or mitigates the anomalous behavior.

Figure 2:
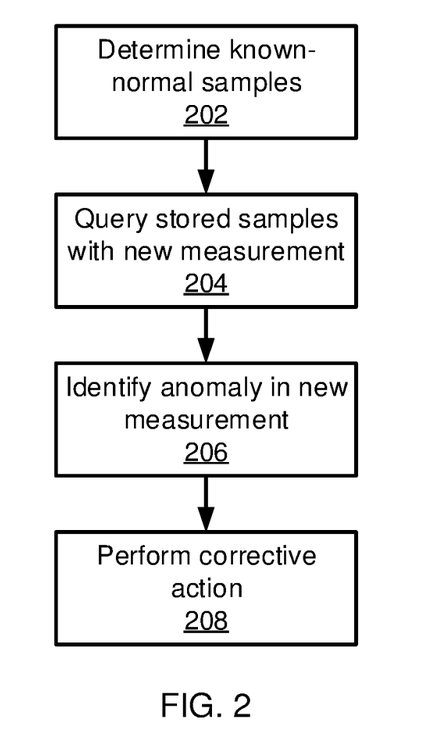
FIG. 2 is a block/flow diagram of a method for anomaly detection and correction in accordance with an embodiment of the present invention.

Referring now to FIG. 2, a method for detecting and correcting anomalous behavior in a monitored system 102 is shown. Block 202 determines known-normal samples and stores them in a database. During this training phase, block 202 accepts a set of time series records from each of the respective sensors 104, during a time period when it is known that the monitored system 102 is operating normally, and generates time segments that represent this normal behavior. Additional detail on the training phase of block 202 is described below.

Block 204 then accepts queries to the stored time segments using features and a hash of a recently measured time segment. Block 206 determines whether the time segment represents anomalous behavior, for example by comparing hash distances between time segments and identifying dissimilar time segments. Additional detail on the query and detection of anomalies is described below. When an anomaly is identified, block 208 performs a corrective action, as described above. This corrective action is selected to bring the measurements of the sensor 104 corresponding to the anomalous time segment back into normal operation. Toward that end, the process of FIG. 2 can be repeated as needed, with additional corrective actions being performed if an initial adjustment does not correct the anomalous behavior.

Figure 3:
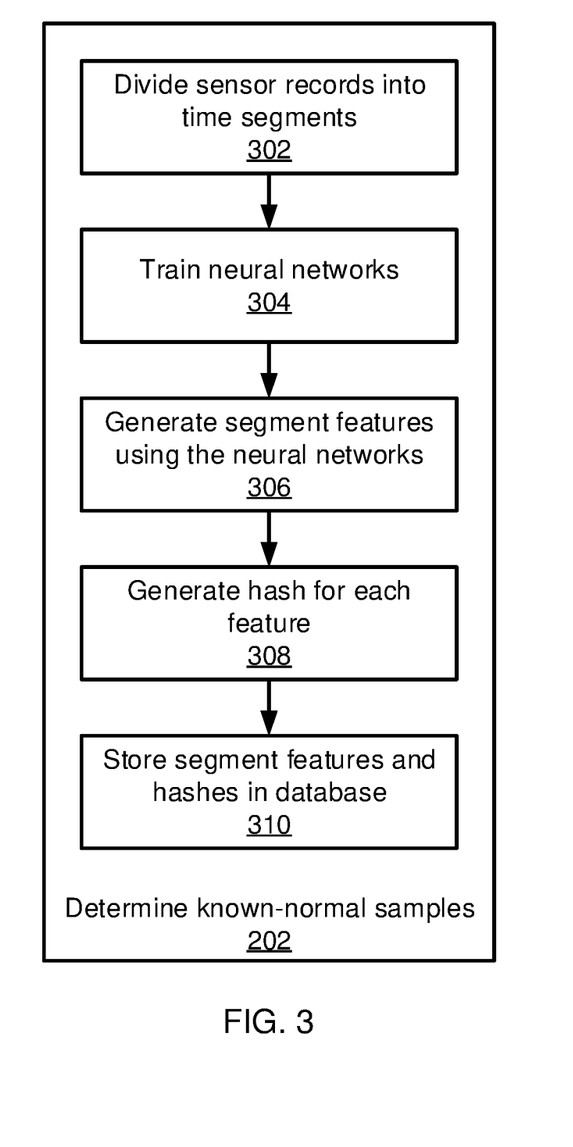
FIG. 3 is a block/flow diagram of a method for determining known-normal samples in accordance with an embodiment of the present invention.

Referring now to FIG. 3, additional detail on the determination of known-normal samples in block 202 is shown. Block 302 divides sensor records into time segments. Each sensor record represents a series of measurements, arranged in time order, from a respective sensor 104. The time segments can be divided into series of measurements taken within any appropriate time period. In some embodiments the segments can be divided periodically, for example covering respective days. In other embodiments, the segments can be divided according to varying time periods or can be triggered by some event.

Block 304 generates data models for the time segments by training a set of neural networks, including input attention-based long-short term memory (LSTM) networks. The neural network accepts a set of time segments for a given sensor 104 and outputs features of the time segments.

Block 306 uses the data models that are generated in block 304 to generate features of the time segments for each sensor 104. In some embodiments, the features can represent high-dimensional vectors, for example with 128 or more dimensions, each having a respective data value. Block 308 then generates a hash of each generated feature. In some embodiments, the hash function used by block 308 can be a sign function over a hidden feature, as described below. Thus, for a feature having n distinct floating point values, the hash of the function would have n binary values, each value representing whether a corresponding data value of the feature was positive or negative. Block 310 stores all of the features and their respective hash codes in a database for future queries.

Figure 4:
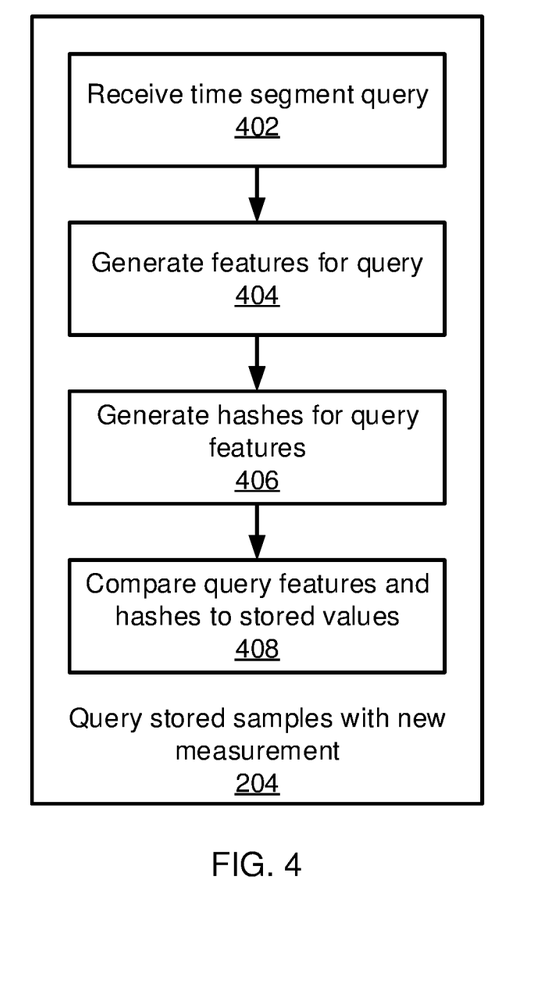
FIG. 4 is a block/flow diagram of a method for querying stored samples with a new measurement in accordance with an embodiment of the present invention.

Referring now to FIG. 4, additional detail on querying stored samples with a new measurement in block 204 is shown. Block 402 receives a new time segment query. The time segment query can stand alone or, in some embodiments, can be part of a longer time series from a sensor 104 that has been split into time segments as described above. Block 404 generates features for the received query using the data model(s) generated in block 304. Block 406 then generates hashes for the query features that are output by the data models, for example using the same hash function as was used to generate the stored hashes in block 308.

Block 408 compares the query feature and hash to stored values. This comparison can be based on, for example, the Hamming distance between the stored hash code(s) and the hash code of the query features. The minimal Hamming distance can be used in some embodiments to perform the comparison.

Figure 5:
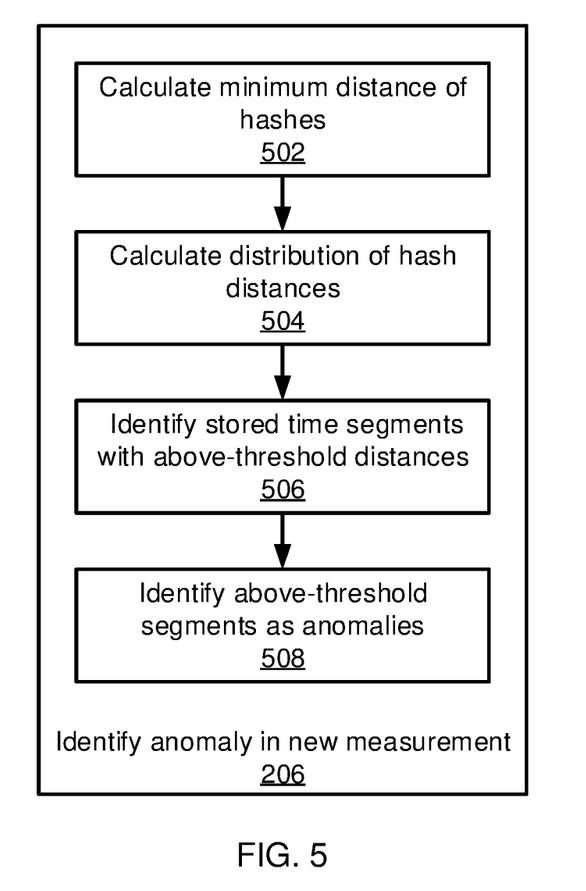
FIG. 5 is a block/flow diagram of a method for identifying an anomaly in a new measurement in accordance with an embodiment of the present invention.

Referring now to FIG. 5, additional detail on the identification of anomalies in new measurements in block 206 is shown. After the query has been performed in block 204 and the hashes of the new measurement have been compared to those of stored time segments, block 502 calculates a minimum distance of the hashes using the distances calculated in block 408. Block 504 calculates a distribution of the hash distances. For example, the minimal Hamming distance between the query and the database of historical segments' hash codes can be determined. Thus, if there is any single stored time segment that has a low hash distance from the query segment, block 504 will generate a low overall value for the query segment.

Thus, in an example with T queries (based upon temporal order) at different time steps, for the $i^{th}$ query, a hash code corresponding to the $i^{th}$ query is compared with the all the hash codes in the database and the minimal Hamming distance is used to produce an anomaly score. Because there are T different steps (queries), the anomaly score varies at different time steps.

Block 506 compares the hash distances for the respective stored time segments to a threshold value. The threshold value can be any appropriate value. In some embodiments, the threshold can be determined as the largest of the determined minimal Hamming distances measured over some validation or training set. Thus, the largest distance measured among known-good time segments can be used as the threshold, where larger distances are identified as being anomalous by block 508.

Figure 6:
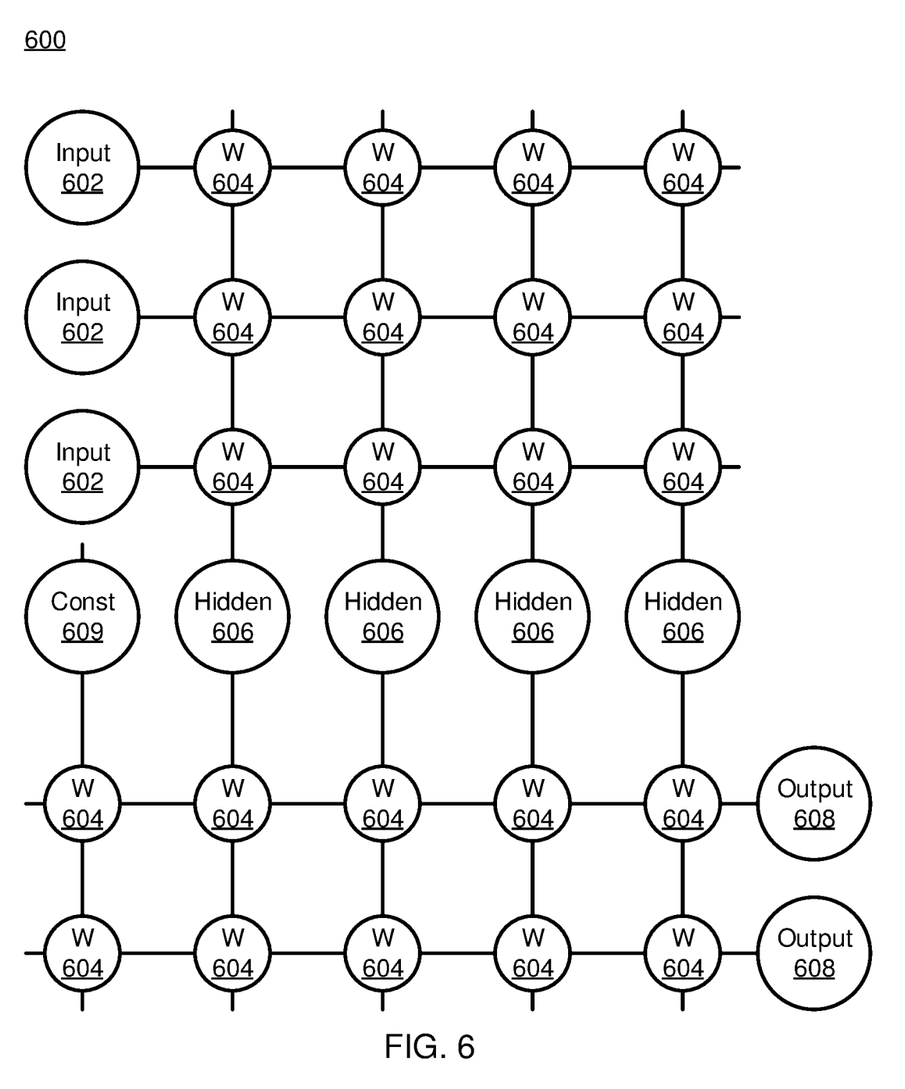
FIG. 6 is a low-level diagram of a neural network architecture in accordance with an embodiment of the present invention.

Referring now to FIG. 6, an artificial neural network (ANN) architecture 600 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 602 each provide an input signal in parallel to a respective row of weights 604. The weights 604 each have a respective settable value, such that a weight output passes from the weight 604 to a respective hidden neuron 606 to represent the weighted input to the hidden neuron 606. In software embodiments, the weights 604 may simply be represented as coefficient values that are multiplied against the relevant signals. The signals from each weight adds column-wise and flows to a hidden neuron 606.

The hidden neurons 606 use the signals from the array of weights 604 to perform some calculation. The hidden neurons 606 then output a signal of their own to another array of weights 604. This array performs in the same way, with a column of weights 604 receiving a signal from their respective hidden neuron 606 to produce a weighted signal output that adds row-wise and is provided to the output neuron 608.

It should be understood that any number of these stages may be implemented, by interposing additional layers of arrays and hidden neurons 606. It should also be noted that some neurons may be constant neurons 609, which provide a constant output to the array. The constant neurons 609 can be present among the input neurons 602 and/or hidden neurons 606 and are only used during feed-forward operation.

During back propagation, the output neurons 608 provide a signal back across the array of weights 604. The output layer compares the generated network response to training data and computes an error. The error signal can be made proportional to the error value. In this example, a row of weights 604 receives a signal from a respective output neuron 608 in parallel and produces an output which adds column-wise to provide an input to hidden neurons 606. The hidden neurons 606 combine the weighted feedback signal with a derivative of its feed-forward calculation and stores an error value before outputting a feedback signal to its respective column of weights 604. This back propagation travels through the entire network 600 until all hidden neurons 606 and the input neurons 602 have stored an error value.

During weight updates, the stored error values are used to update the settable values of the weights 604. In this manner the weights 604 can be trained to adapt the neural network 600 to errors in its processing. It should be noted that the three modes of operation, feed forward, back propagation, and weight update, do not overlap with one another.

Figure 7:
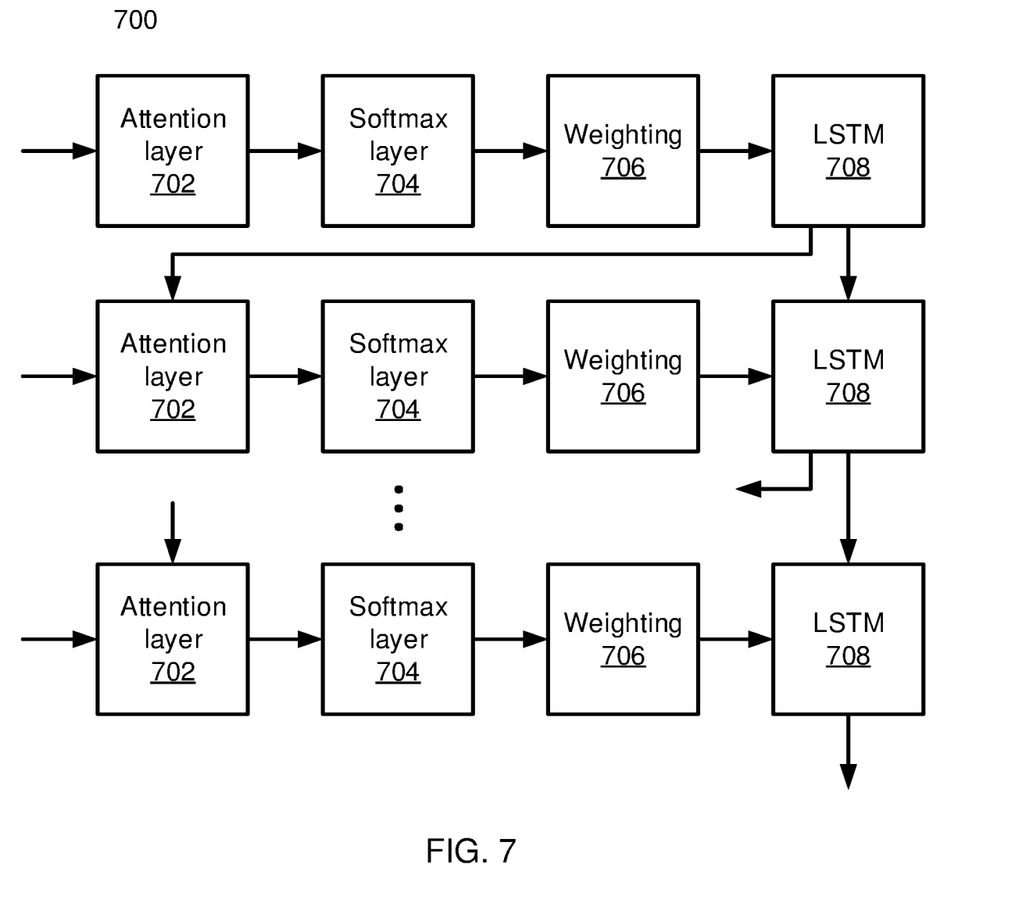
FIG. 7 is a high-level diagram of a neural network architecture in accordance with an embodiment of the present invention.

Referring now to FIG. 7, a structure for a feature extraction data model neural network is shown. The network 700 takes a time segment as an input. The time segment, which represents a time-ordered series of data points, is divided into portions of length T, measured by time or by a number of datapoints. The network 700 includes a number of chains that is equal to the length of the time segment, divided by the length T. The time segment is then applied as a set of inputs to a respective chain, divided into its portions of length T. An input attention layer 702 receives the portions of the time segment and, for chains after the first chain, the attention layer 702 also accepts as input the output of a previous chain's hidden state. In some embodiments, the attention layer 702 in the first chain can use a zero-vector as its hidden state vector, since there is no previous hidden state.

The attention layer 702 generates a set of weights for the respective portions of the time segment. These weights are normalized in softmax layer 704 so that the weights have a sum of one. The input portions are each multiplied by the respective weights in weighting block 706. The weighted input is then applied to a long-short term memory (LSTM) block 708. Although LSTM blocks are specifically contemplated, it should be understood that gated recurrent units (GRUs) could be used instead.

The LSTM block 708 generates a hidden state for the chain that is also applied as an input to the LSTM block 708 of the next chain. Thus each LSTM block 708 accepts two inputs: the hidden state $h_{t-1}$ of the previous chain's LSTM block 708 and the weighted portion $\tilde{x}_t$ output by a respective weighting block 706. The two inputs are combined to form an output $h_t = f_1(h_{t-1}, \tilde{x}_t)$, wherein the function $f_1$ is an LSTM unit. For the first chain, where there is no previous hidden state, the value of $h_0$ can be set to a zero vector. The output of the final chain is a set of features of the input time segment, for example expressed as a vector of data values, each data value representing a respective feature.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 8:
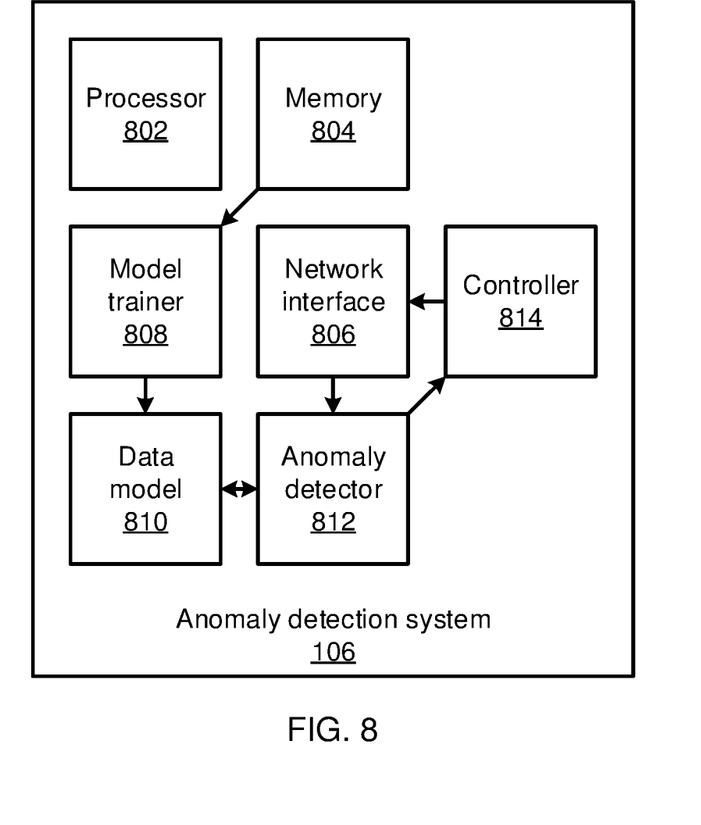
FIG. 8 is a block diagram of a system for anomaly detection and correction in accordance with an embodiment of the present invention

Referring now to FIG. 8, additional detail on the anomaly detection system 106 is shown. The system 106 includes a hardware processor and a memory 804. A network interface 806 communicates with the monitored system 102 and the sensors 104, receiving time series data from the sensors 104 and issuing commands to elements of the monitored system 102 by any appropriate wired or wireless communications medium and protocol.

A model trainer 808 generates a data model 810 based on a set of training data that is made up of time series collected from the sensors 104 during time periods where operations are known to represent normal behavior. In addition to generating the data model 810, the model trainer 808 uses the data model 810 to generate a set of features and hashes for each of the time segments in the training set. The resulting data model 810 is used by anomaly detector 812 to identify features of newly measured time segments to determine whether the time segment represents anomalous behavior.

A controller 814 uses the network interface 806 to issue instructions to components of the monitored system 102 to automatically correct anomalies that have been indicated by the anomaly detector 812. These instructions can, for example, control the behavior of one or more operational characteristics of the monitored system 102 to bring the anomalous sensor readings back into a normal operational range.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and correcting anomalies comprises:
generating a hash code for a new time series segment, generated by a sensor in a cyber-physical system, and for each of a plurality of previous time series segments of the sensor, by applying a sign function to each value in a vector of feature values to generate a hash vector that has a same dimensionality as the vector of feature values;
comparing the new time series segment to the plurality of previous time series segments to generate a similarity measure for each previous time series segment by determining a distance between the hash code for each previous time series segment and the new time series segment;
determining that the new time series segment represents anomalous behavior based on the similarity measures; and
performing a corrective action on the cyber-physical system to correct the anomalous behavior, the corrective action being selected from the group consisting of changing a security setting for an application or hardware component of the cyber-physical system, halting or rebooting a hardware component of the cyber-physical system, changing an environmental condition of the cyber-physical system, and changing status of a network interface of the cyber-physical system.

2. The method of claim 1, wherein determining the distance comprises determining a Hamming distance between respective hash codes.

3. The method of claim 1, wherein determining that the new time series segment represents anomalous behavior includes:
identifying a lowest distance among the determined distances between hash code of the new time series segment and the hash codes of the previous time series segments; and
comparing the lowest distance to a threshold value.

4. The method of claim 3, wherein determining that the new time series segment represents anomalous behavior further includes determining that the lowest distance is above the threshold value.

5. The method of claim 3, further comprising determining the threshold value by determining a Hamming distance between hash codes of each of the previous time series segments and selecting a highest Hamming distance as the threshold.

6. The method of claim 1, wherein comparing comprises determining features of the new time series segment by weighting portions of the new time series segment according to an input attention neural network layer.

7. The method of claim 6, wherein determining features further includes combining information from different portions of the new time series segment using long-short term memory neural network layers.

8. A system for detecting and correcting anomalies comprises:
- an anomaly detector configured to generate a hash code for a new time series segment, generated by a sensor in a cyber-physical system, and for each of a plurality of previous time series segments of the sensor, by applying a sign function to each value in a vector of feature values to generate a hash vector that has a same dimensionality as the vector of feature values, to compare the new time series segment to the plurality of previous time series segments to generate a similarity measure for each previous time series segment by determining a distance between the hash code for each previous time series segment and the new time series segment, and to determine that the new time series segment represents anomalous behavior based on the similarity measures; and
- a controller configured to perform a corrective action on the cyber-physical system to correct the anomalous behavior, the corrective action being selected from the group consisting of changing a security setting for an application or hardware component of the cyber-physical system, halting or rebooting a hardware component of the cyber-physical system, changing an environmental condition of the cyber-physical system, and changing status of a network interface of the cyber-physical system.

9. The system of claim 8, wherein the anomaly detector is further configured to determine a Hamming distance between respective hash codes.

10. The system of claim 8, wherein the anomaly detector is further configured to identify a lowest distance among the determined distances between hash code of the new time series segment and the hash codes of the previous time series segments and to compare the lowest distance to a threshold value.

11. The system of claim 10, wherein the anomaly detector is further configured to determine that the lowest distance is above the threshold value.

12. The system of claim 10, wherein the anomaly detector is further configured to determine a Hamming distance between hash codes of each of the previous time series segments and to select a highest Hamming distance as the threshold.

13. The system of claim 8, wherein the anomaly detector is further configured to determine features of the new time series segment by weighting portions of the new time series segment according to an input attention neural network layer.

14. The system of claim 13, wherein the anomaly detector is further configured to combine information from different portions of the new time series segment using long-short term memory neural network layers.

* * * * *